United States Patent [19]

Morri

[11] Patent Number: 5,133,223
[45] Date of Patent: Jul. 28, 1992

[54] DEVICE FOR STEERING THE FRONT WHEEL OF A MOTOR VEHICLE

[75] Inventor: Guiseppe Morri, Rimini, Italy

[73] Assignee: Bimota S.P.A., Rimini, Italy

[21] Appl. No.: 606,492

[22] Filed: Oct. 31, 1990

[30] Foreign Application Priority Data

Nov. 8, 1989 [IT] Italy .................. 3695 A/89

[51] Int. Cl.⁵ .............................. B62D 1/20
[52] U.S. Cl. ...................... 74/496; 180/219; 280/92; 280/963
[58] Field of Search ............ 74/496; 180/219; 280/92, 96.3

[56] References Cited

U.S. PATENT DOCUMENTS

| 680,668 | 8/1901 | Osborn | 280/96.3 |
| 2,747,818 | 5/1956 | Grudin | 280/92 X |
| 4,712,639 | 12/1987 | Kawaguchi | 180/219 |

FOREIGN PATENT DOCUMENTS

| 211638 | 2/1987 | European Pat. Off. . |
| 2431416 | 7/1978 | France . |
| 1171971 | 7/1987 | Italy . |
| 833741 | 4/1960 | United Kingdom . |
| 1274441 | 5/1972 | United Kingdom . |
| 2087326 | 5/1982 | United Kingdom . |

Primary Examiner—Allan D. Herrmann
Assistant Examiner—David W. Laub
Attorney, Agent, or Firm—Fay, Sharpe, Beall, Fagan, Minnich & McKee

[57] ABSTRACT

The steering device consists in a first hub to support the wheel, an internal second hub rotatably and coaxially supporting the first, a steering pivot accommodated internally of the second hub, on which the wheel can be swung from side to side, and an axle pivot, perpendicular to the steering pivot and suspended from the frame on quadrilateral linkages, which is able to rise and fall while remaining fixed in relation to the wheel; the inner hub is controlled by a lever that projects clear of the first hub and is hinged by its projecting end to a control rod, the rod in turn is connected by way of a mechanical linkage with the handlebars of the machine.

9 Claims, 3 Drawing Sheets

DEVICE FOR STEERING THE FRONT WHEEL OF A MOTOR VEHICLE

BACKGROUND OF THE INVENTION

The invention relates to a device for steering the front wheel of a motor vehicle.

Italian Pat. No. 1 171 971, property of the same applicant, discloses a steering device of the type in question, which is designed to overcome certain drawbacks typical of the front suspension forks of motor cycles. The problems encountered with these front forks, which consist generally in a pair of telescopic damper struts located one on either side of the front wheel and carrying the relative pivot, derive from the difference in reaction of the two dampers and their inability to absorb shock from minor surface irregularities while compensating smoothly at the same time for major irregularities. The device in question was also designed to address new problems stemming from previous devices, which had succeeded in overcoming the drawbacks typical of front forks but required a non-symmetrical wheel and did not permit of designing an efficient and easily handled motor cycle.

The patent device referred to above consisted in a first hub carrying the front wheel, a second hub mounted coaxial with, internally of and rotatable in relation to the first, a steering pivot located internally of the second hub, perpendicular and rotatable with respect thereto about its own axis, and an axle pivot disposed at right angles to and rigidly associated with the steering pivot.

The axle pivot, disallowed rotation about its own axis, was permanently associated with the frame of the motor cycle by way of a parallelogram linkage. A lever associated with the second hub emerged from the first hub and was hinged by its projecting end to control means operated from the handlebars.

The inventor of the device envisaged the use of hydraulic control means, for example a fluid power cylinder installed between the lever of the second hub and the parallelogram linkage, which would be operated by the handlebars.

Whilst such a system might appear contemporary, given its similarity to servo linkages adopted in the great majority of motor vehicles to give easier handling, the drawbacks betrayed are nonetheless unacceptable for a machine intended for road use, and more especially for use in competition.

A first drawback is that of an insufficient level of safety, given that the cylinder can only operate if connected to a pressurized hydraulic circuit.

This can be achieved either by using the engine of the vehicle to pressurize a hydraulic circuit into which the cylinder is connected, or by connecting the cylinder into an independent hydraulic circuit pressurized by a gas accumulator.

In either case, there are drawbacks: in the first instance, the front wheel can be steered only when the engine of the motor vehicle is running, whereas the second option involves an additional and not infrequent routine servicing operation. In effect, the gas in a container of the type in question must be charged at high pressure (a significant number of atmospheres) in order to function effectively, but this same high pressure, besides increasing the likelihood of leaks, cannot be topped up utilizing normal low cost compressors. Accordingly, whilst a pressurized gas supply guarantees safe operation even with the engine off, the guarantee is limited in terms of duration, and if the acceptability of such a solution is doubtful enough in the case of a competition machine, it must be totally excluded in a standard production machine for obvious reasons. Yet another drawback connected with the hydraulic control is that of its own inertia; notwithstanding the high pressure to which the fluid operating the hydraulic cylinder is subject, movement of the handlebars is not transmitted instantaneously to the front wheel. Such inertia is hazardous in a road machine, especially when effecting sharp and sudden maneuvers, but altogether intolerable in a competition machine where swift handling response is a fundamental requirement.

Accordingly, the object of the present invention is to provide a steering device for motor vehicles, possessing the necessary precision and swiftness of response typical of a normal front fork, together with the positive features characteristic of the patent system outlined above.

SUMMARY OF THE INVENTION

The stated object is realized by adoption of the steering device disclosed, which comprises two concentric and mutually rotatable hubs, a steering pivot accommodated transversely and rotatably by the inner hub and providing the steering axis, and an axle pivot set at right angles to and rigidly associated with the steering pivot, all essentially as in the device mentioned above. The axle pivot is again suspended from the frame of the machine using a quadrilateral linkage arrangement, and preferably two linkages in fork formation.

Inertia is eliminated by adopting an all-mechanical linkage of rods and levers to connect the steered hub to the handlebars, with the result that there can be no movement of the second hub about the axis of the steering pivot induced by movement of the front wheel in relation to the frame.

To advantage, the quadrilateral linkages will be cushioned by at least one strategically positioned damper, such that shock is absorbed predominantly by the frame.

BRIEF DESCRIPTION OF THE DRAWINGS

The invention will now be described in detail, by way of example, with the aid of the accompanying drawings, in which:

FIG. 3 is a further schematic of the front part of a vehicle, viewed in perspective from the opposite direction to that of FIG. 2 and with certain parts omitted better to reveal others.

Figure 1:
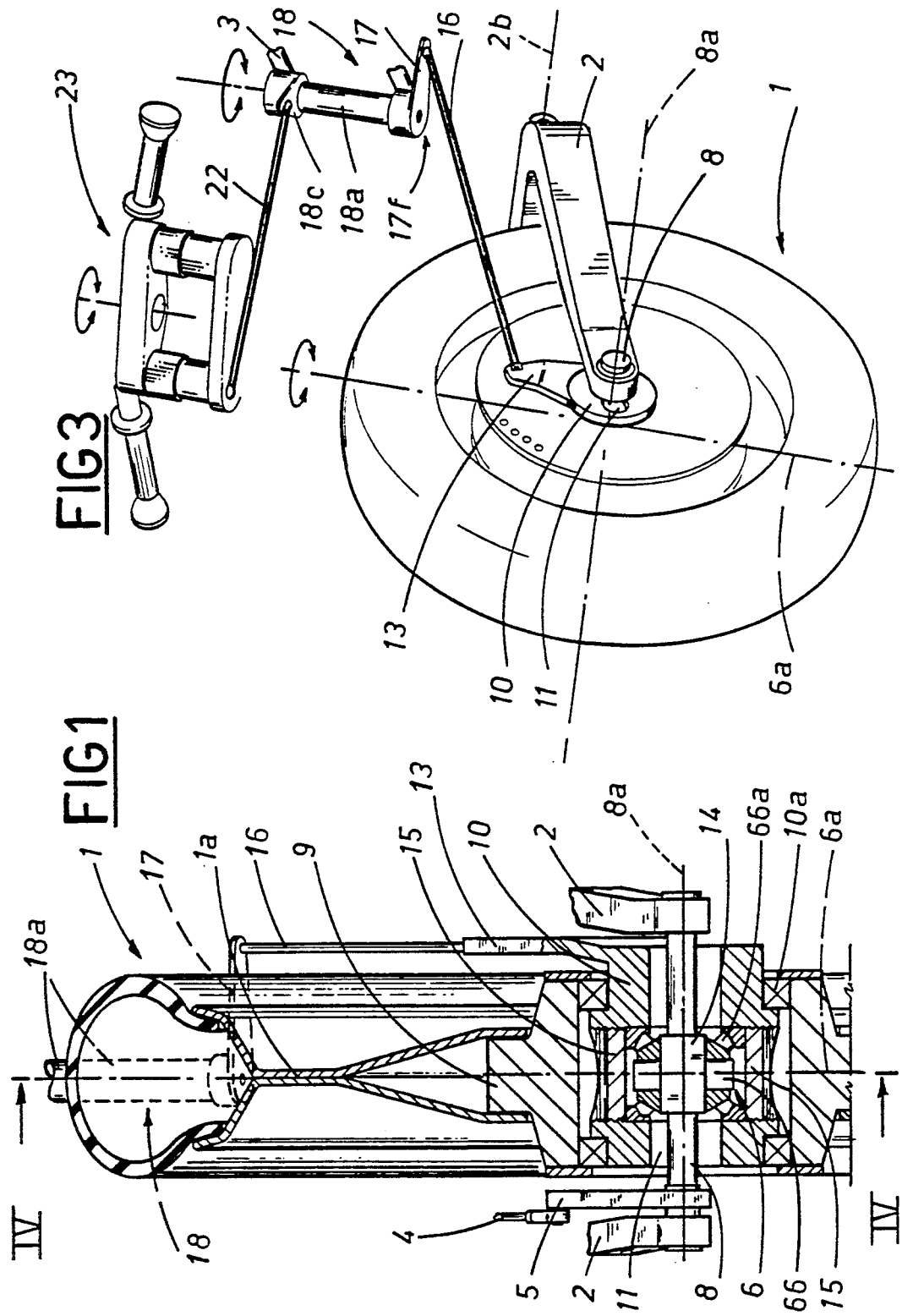
FIG. 1 is a schematic representation of the front wheel of a motor vehicle incorporating the device according to the invention, viewed in cross section with certain parts cut away to reveal others.

With reference to the accompanying drawings, the steering device according to the present invention essentially comprises a pair of coaxial hubs 9 and 10, and two rigidly associated pivots, a steering pivot 6 and an axle pivot 8.

A first outer hub 9, serving to support the disk 1a of a wheel 1, is supported in turn by the internal second hub 10 and freely rotatable in relation thereto about a longitudinal or wheel axis.

Figure 2:
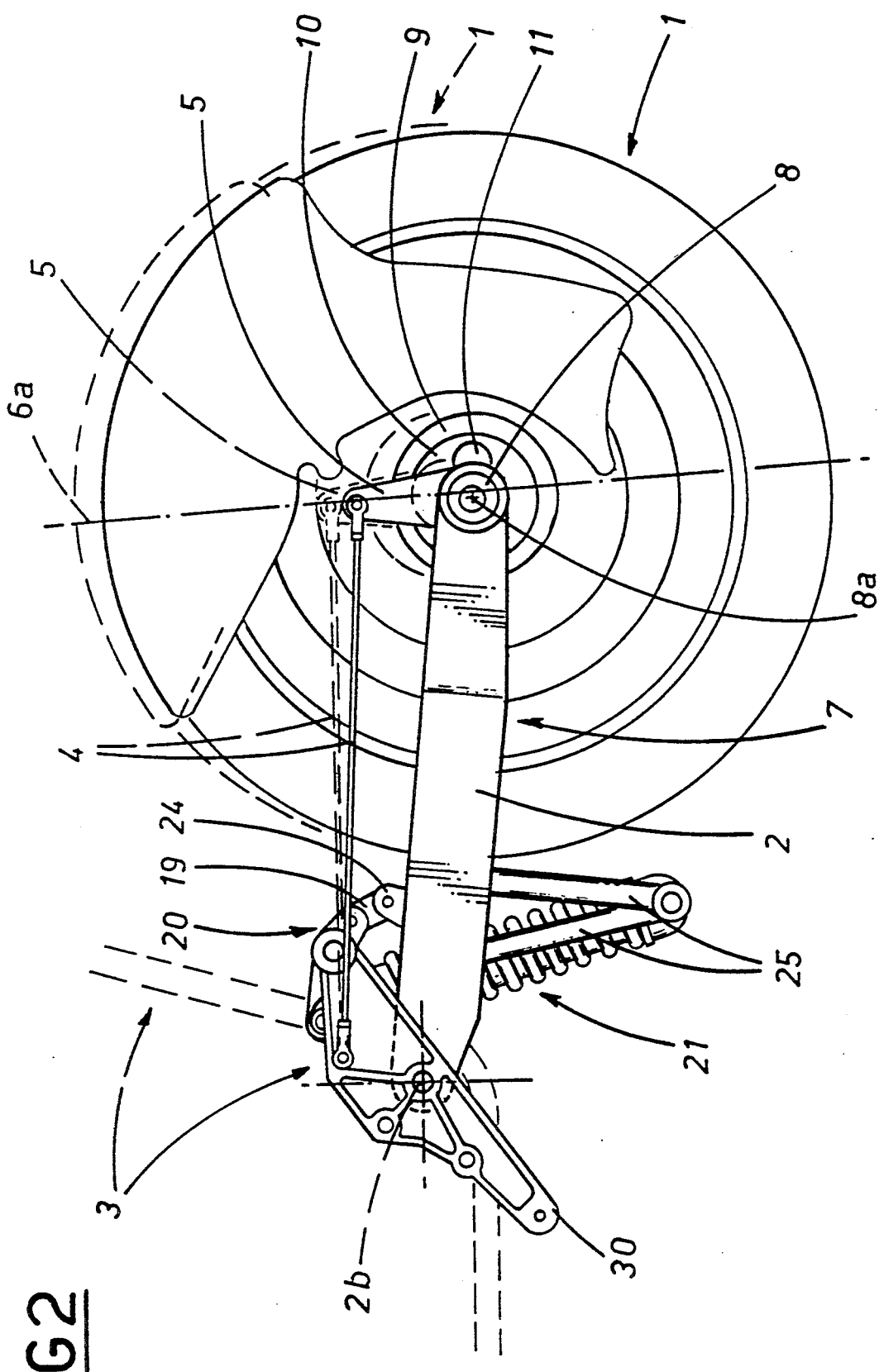
FIG. 2 is a schematic side elevation of the front part of a motor vehicle fitted with the device according the invention.

The steering pivot 6 is accommodated internally of the second hub 10, perpendicularly disposed as shown in FIG. 1, and in such a way that the hub 10 can be rotated transversely about the axis 6a of the pivot 6, which is also the steering axis of the vehicle; FIG. 2 illustrates the operative position of this same axis 6a, angled away from the vertical toward the vehicle.

The axle pivot 8 is disposed at right angles to the steering pivot 6 and projects from the hub 10 on either side through respective slots 11, which are formed in the hub 10 itself and of dimensions such as to ensure that no contact will occur with the axle pivot 8 when the hub 10 is rotated about the steering axis 6a.

The axle pivot 8 is connected to the frame 3 of the vehicle by way of an articulated quadrilateral type linkage 7 consisting in two arms 2 and 4 and a connecting rod 5. The arms 2 and 4 are pivotably anchored to the frame 3 at one end, and at their remaining ends to each end of the connecting rod 5. The point of articulation between the arm denoted 2 and the rod 5 is provided by the axle pivot 8, as discernible from FIGS. 1 and 2. More exactly, the one arm 2 and the axle pivot 8 are coupled in such a way as to enable their mutual rotatation, whereas the connecting rod 5 is keyed to the pivot 8 (see FIG. 1), for example by way of splines. Thus, the axle pivot 8 possesses freedom of movement in relation to the frame 3 through one direction only, i.e. a circumferential arc disposed concentrically in relation to the axis 2b about which the arm denoted 2 is rotatable in relation to the frame 3. Accordingly, the axle pivot 8 is fixed for steering purposes, and rotation of the wheel 1 about the steering axis 6a is produced by rotation of the hub 10, as will become clear in due course.

In a device thus embodied, it becomes possible for the arm denoted 2, which replaces the fork of a conventional steering device, to be embodied either as a single strut supporting a cantilevered axle pivot 8 or as a yoke with two members (see FIG. 3). In the example of FIG. 1, the axle pivot 8 will be seen to comprise an intermediate section 14 with which two coaxial pins 66 are associated, one on either side of the longitudinal axis 8a of the axle pivot 8; in practice, these two pins 66 combine to create the steering pivot 6. For a more precise and swifter response at the pivot 6, the pins 66 can be supported internally of the inner hub 10 by means of respective bearings 66a accommodated in seatings afforded by the hub itself and secured against the intermediate section 14 from the opposite sides by respective caps 15 (see FIG. 1).

With the axle pivot 8 and steering pivot 6 arranged in this manner, the pins 66 can be disposed such that their axes coincide with the steering axis 6a, perpendicular to but not intersecting the axis 8a of the axle pivot 8. In particular, the axle pivot axis 8a is located forward of the steering axis 6a in such a way that the wheel 1 remains in a state of constant instability, as regards its alignment balance, with the vehicle in motion; this, the normal setting adopted for a conventional front fork, permits of steering the wheel 1 swiftly and with a minimum of effort.

13 denotes a lever associated with the inner hub 10 and projecting from the outer hub 9, of which the projecting end articulates with a control rod 16; the control rod 16 in turn is connected by way of a linkage mechanism 18 to the steering control of the vehicle, generally a pair of handle bars 23. In the embodiment shown in FIG. 3, the mechanism 18 consists in a rocker lever, pivoted centrally to the frame 3 and connected by way of a transmission rod 22 to a point on the handlebars 23 offset from their axis of rotation. The lever 18 is connected by its opposite ends to the control rod 16 and the transmission rod 22, and embodied as an essentially upright barrel 18a carried by the frame 3, capable of rotating about its own axis and incorporating two arms 18c and 17 located one at each end, with which the two respective rods 16 and 22 articulate. The distances between the various pivot axes of the mechanical linkage connecting the wheel hub 10 to the handlebars 23 are calculated such, that with the handlebars 23 stationary at any angle and the fork 2 in motion, there is no relative movement between hub 10 and steering pivot 6.

With a device embodied according to the invention, rotation of the handlebars 23 in either direction, however slight, will be transmitted instantly and directly to the hub 10 by way of the control rod 16 and the lever 13, these two being articulated at a point offset from the steering axis 6a, and the hub is duly rotated through a corresponding angle about the steering axis 6a.

To exploit the various structural elements of the device thus described to best advantage, the arm denoted 4 and the control rod 16 are positioned on opposite sides of the wheel 1, as discernible from FIGS. 2 and 3.

Figure 4:
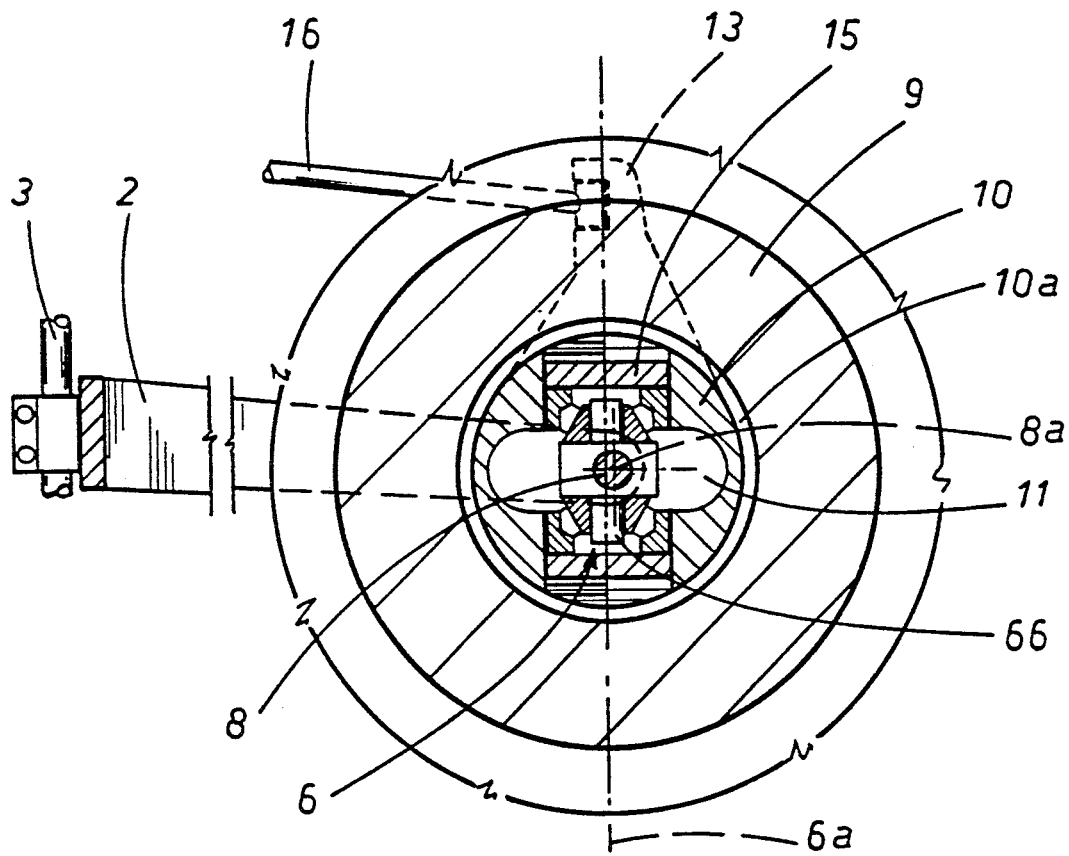
FIG. 4 is a cross-sectional view along line IV-IV of the front wheel of FIG. 1 with certain parts omitted for the sake of clarity.

As seen in FIG. 4, the device for steering the front wheel of the motor vehicle thus includes the first hub or outer hub 9, which has a horizontal axis and supports the disk 1a of the wheel, and the second hub or internal hub 10. The second hub 10 is coaxial with the first hub and is accommodated internally of the first hub. The second hub is so configured that it is rotatable relative to the first hub. The steering pivot 6 is accommodated internally of the second hub 10 and is rotatable therewith. The steering axis 6a of the front wheel diverges away from the vertical as best seen in FIG. 3. Centrally located on the wheel is the axle pivot 8. This occupies a plane perpendicular to the steering pivot 6. The axle pivot 8 projects through the inner or second hub 10 by means of slots 11. Because of their geometry, the slots 11 prevent contact between the inner hub 10 and the axle pivot 8 when the axle pivot is rotated about the steering pivot 6. A quadrilateral linkage 7 supports the front wheel and connects it to the frame 3 of the vehicle. The quadrilateral linkage includes at least one arm 2 pivotally anchored at one end to the frame 3. An opposite end of the at least one arm 2 is connected directly to the axle pivot 8. The quadrilateral linkage 7, as best seen in FIG. 2, also includes an interconnecting rod 5. One end of the rod 5 as well as one end of the arm 2 are associated rigidly and rotatably with the axle pivot 8 at a point external to the second hub 10. The steering device for the vehicle further includes an orienting means for orienting the front wheel. As shown in FIG. 3, this includes the lever 13 which is rigidly joined to the second hub 10 and projects clear of the first hub 9 as well as a control rod 16. The control rod is pivotally connected at one end to a projecting end of the lever 13 and at the other end to the arm 17. The arm 17 is part of a linkage mechanism 18 which also includes a barrel 18a and a second arm 18c that is connected by means of a rod 22 to the handlebars 23. The connection is at the point offset from the center of rotation of the handlebars.

According to a further expedient of the invention aimed at enhancing the performance of the device, the fork 2 is associated rigidly with a top and a bottom bracket denoted 24 and 25 respectively. The top bracket 24 articulates with one end of a short connecting rod 19, of which the remaining end articulates in turn with on end of a rocker 20 pivoted at mid length to the frame 3. The bottom bracket 25 is embodied, advantageously from the weight standpoint, in two straight lengths joined together and hinged to one end of a damper 21 of which the remaining end is hinged to the remaining end of the rocker 20 (see FIG. 2). To ensure an efficient balancing of the forces in play, and in the event that the wheel is supported by a fork 2 as in FIG. 3 rather than the single strut, a pair of brackets 24 and 25 might be fitted to each member of the fork 2, associated with a single damper 21 positioned between the two members.

The distances between the various articulations of the arrangement thus described are such that the damper 21 will react swiftly when any irregularity in the road or track surface is encountered by the wheel 1, and such also, that stresses not directly affecting the wheel 1, e.g. braking stresses, will be absorbed almost entirely by the frame 3 of the machine before reaching the damper 21. Accordingly, optimum response is obtained from the machine when braking on rough surfaces; indeed without such a response the effect of braking stress and irregular surfaces would be to compress the damper 21 and produce an incorrect reaction.

The foregoing description implies no limitation in terms of embodiment; for example, rotation of the linkage mechanism 18 might be transmitted from the handlebars 23 through a cardan shaft or indeed any other mechanical transmission substantially devoid of inertia.

What is claimed is:

1. A device for steering the front wheel of a motor vehicle, comprising:
    a first hub having a horizontal axis which is parallel to a ground surface on which the motor vehicle travels, said first hub supporting a disk of the wheel;
    a second hub coaxial with said first hub, said said second hub being accommodated internally of said first hub and being configured such that the second hub is rotatable relative to the first hub;
    a steering pivot accommodated internally of said second hub and rotatable with the second hub, wherein an axis of said steering pivot diverges from a vertical axis which is perpendicular to the support surface;
    an axle pivot, rigidly associated with the steering pivot and occupying a plane perpendicular to the steering pivot, said axle pivot projecting through the second hub via slots which, because of their geometry, prevent contact between the second hub and the axle pivot when the axle pivot is rotated about the steering pivot wherein an axis of said axle pivot does not intersect and axis of said steering pivot;
    a quadrilaterial linkage, by which the front wheel is supported and connected to a frame of the vehicle, said quadrilateral linkage comprising two arms pivotally anchored to the frame of the vehicle and an interconnecting rod, wherein the rod and one of said two arms are associated rigidly and rotatably with the axle pivot at a point external to the second hub; and,
    orienting means for orienting the front wheel comprising:
    a lever rigidly joined with the second hub and projecting clear of the first hub,
    a control rod pivotally connected at one end to a projecting end of the lever, and
    a steering linkage, by which the second hub is connected mechanically to a pair of handlebars of the motor vehicle, a second end of said control rod being pivotally connected to said steering linkage.

2. A steering device as in claim 1, wherein the control rod is pivotally connected to its remaining end to a lever arm of said steering linkage, said lever arm being pivotally anchored to the frame of the vehicle, said lever arm rotating in a first, then a second direction about the relative fulcrum by a link member connected directly to the handlebars.

3. A steering device as in claim 2, wherein the lever arm comprises one arm of a rocker lever pivoted intermediately to the frame of the vehicle, of which a second arm is pivotally connected to one end of the link member which comprises a transmission rod articulated at the opposite end with the handlebars at a point offset from their center of rotation in such a way that the dimensions and pivot axes of the handlebars, transmission rod, lever, control rod and hub lever combine to prevent rotational movement of the second hub about the axis of the steering pivot deriving from movement of the front wheel relative to the frame.

4. A steering device as in claim 1, wherein the axis of the axle pivot is positioned forward of the axis of the steering pivot in relation to a direction of forward motion of the vehicle.

5. A steering device as in claim 1, further comprising a second linkage whereby the quadrilateral arm connected to the hub is pivotally connected on an upper surface of the arm with one end of a further connecting rod articulated at its remaining end with one end of a rocker, the rocker being pivotally anchored at its midpoint to the frame of the vehicle and articulated at its other end with one end of a telescopic damper strut of which the remaining end is articulated with a lower surface of the quadrilateral arm such that it is at a height lower than that of the point of articulation between the arm and the connecting rod, wherein the distances separating the arm, connecting rod, rocker and damper are such as to ensure that forces not directly associated with the front wheel are absorbed by the frame.

6. A device for steering the front wheel of a motor vehicle, comprising:
    a frame of the motor vehicle;
    a linkage by which the front wheel is supported and connected to said frame;
    a first hub, having a first axis which is parallel to a ground support surface on which the motor vehicle travels, supporting a disk of the front wheel;
    a second hub coaxial with said first hub, said second hub being accommodated within said first hub and being rotatable relative to said first hub;
    a steering pivot located in said second hub, an axis of said steering pivot being perpendicular to said first axis;
    an axle pivot, rigidly secured to said steering pivot and extending through said second hub, wherein said axle pivot is rotated about said steering pivot and wherein said axle pivot has an axis which is offset from said steering pivot axis; and,
    orienting means for orienting the front wheel, comprising:

a lever rigidly secured to said second hub and projecting clear of said first hub, a control rod having a first end secured to a free end of said lever, and a steering linkage, by which said second hub is mechanically connected to a pair of handlebars of the motor vehicle, a second end of said control rod being pivotally connected to said steering linkage.

7. The steering device of claim 6 wherein said steering linkage comprises:

a transmission rod connected at a first end to said pair of handlebars; and, a lever connected at a first end to a second end of said transmission rod and at a second end to said second end of said control rod.

8. The steering device of claim 7 wherein said transmission rod first end is pivotally secured to said handlebars at a location offset from a center of symmetry of said handlebars.

9. The steering device of claim 7 wherein said lever comprises:

a barrel rotatably secured to said frame;

a first arm secured to a first end of said barrel, said transmission rod second end being pivotally secured to said first arm; and, a second arm secured to a second end of said barrel, said control rod second end being pivotally secured to said second arm.

* * * * *

UNITED STATES PATENT AND TRADEMARK OFFICE
CERTIFICATE OF CORRECTION

PATENT NO. : 5,133,223
DATED : July 28, 1992
INVENTOR(S) : Giuseppe Morri

It is certified that error appears in the above-indentified patent and that said Letters Patent is hereby corrected as shown below:

On the title page, Item [75]:

Inventors name should read as "Giuseppe".

Signed and Sealed this

Thirty-first Day of August, 1993

Attest:

BRUCE LEHMAN

Attesting Officer     Commissioner of Patents and Trademarks